D. HEGGIE.
UNIVERSAL CHUCK.
APPLICATION FILED JULY 14, 1914.
1,152,175.
Patented Aug. 31, 1915.
2 SHEETS—SHEET 2.
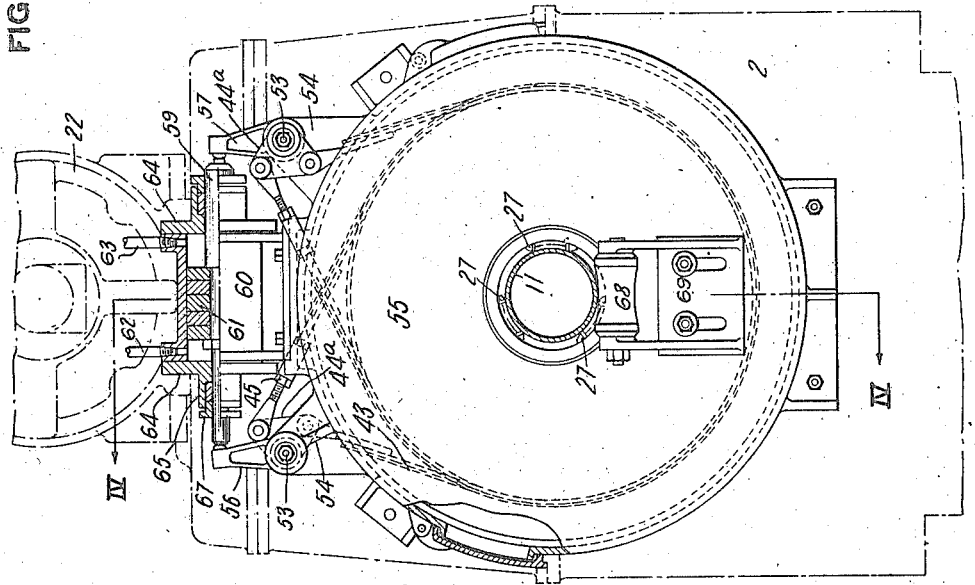
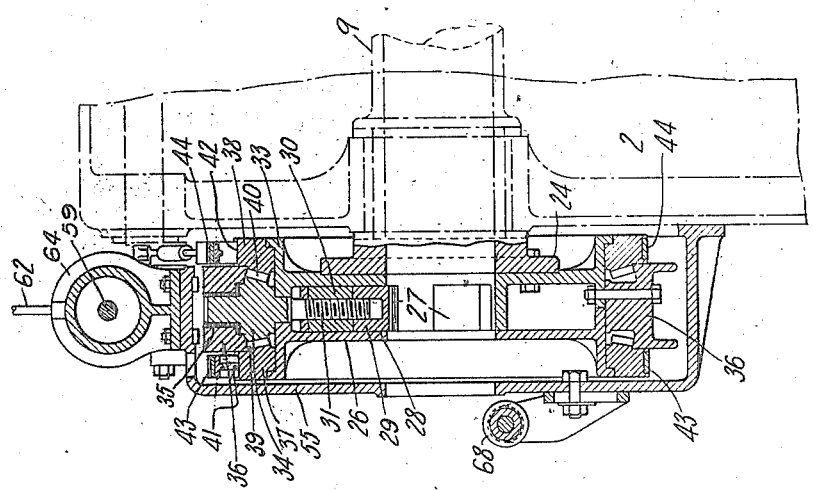
WITNESSES
INVENTOR

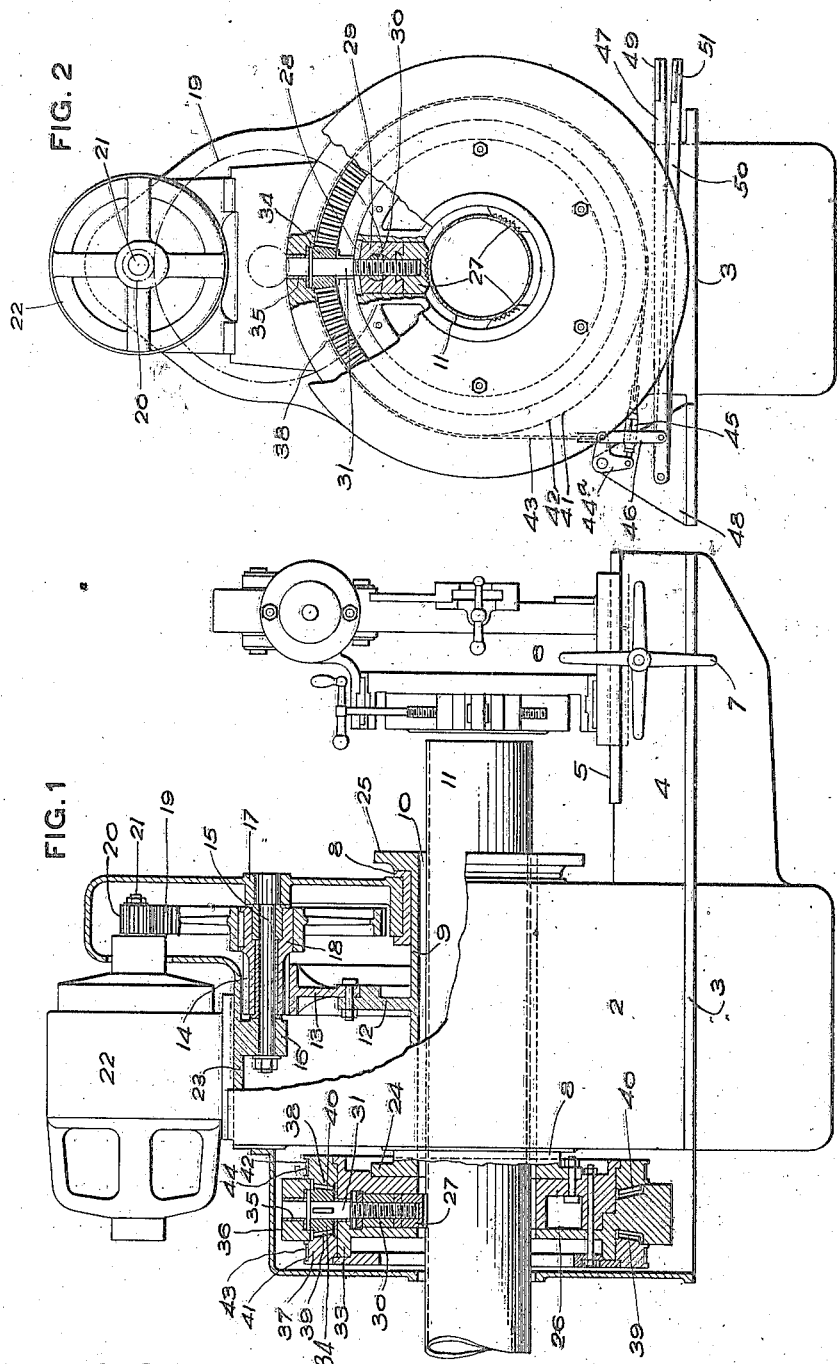

UNITED STATES PATENT OFFICE.

DAVID HEGGIE, OF LORAIN, OHIO, ASSIGNOR TO NATIONAL TUBE COMPANY, OF PITTSBURGH, PENNSYLVANIA, A CORPORATION OF NEW JERSEY.

UNIVERSAL CHUCK.

1,152,175.  Specification of Letters Patent.  Patented Aug. 31, 1915.

Application filed July 14, 1914. Serial No. 850,899.

*To all whom it may concern:*

Be it known that I, DAVID HEGGIE, a citizen of the United States, and resident of Lorain, in the county of Lorain and State of Ohio, have invented a new and useful Universal Chuck, of which the following is a specification.

My invention relates to the class of apparatus or tools known as chucks and employed in gripping and holding articles while the articles are being machined or finished and, while not restricted to such use, more particularly relates to chucks forming part of pipe threading machines and used in gripping the pipes, or equivalent tubes, during the thread cutting operations by which the ends of the pipes or tubes are threaded.

One object of my invention is to provide a universal chuck having novel means whereby the chuck jaws are actuated in the jaw opening and closing movements necessary in gripping pipes and tubes in the pipe threading operations.

Another object of my invention is to provide a universal chuck of improved construction having novel means whereby the jaw operating mechanism is manipulated in the jaw opening and closing operations.

Still further objects of the invention will become apparent hereinafter as the invention is described in detail and more fully pointed out in the appended claims.

Referring now to the drawings forming part of this specification, Figure 1 is a side elevation, partly in section, showing a pipe threading machine having a universal chuck and chuck operating mechanism constructed and arranged and applied for use thereon in accordance with my invention. Fig. 2 is an end elevation, partly in section of the apparatus shown in Fig. 1. Fig. 3 is an end elevation partly in section showing a modified and preferred form of construction in which the friction bands forming part of the apparatus are power actuated, instead of being operated manually as in the apparatus of Figs. 1 and 2. Fig. 4 is a detail sectional side elevation of the apparatus shown in Fig. 3, the section being taken on the line IV—IV of Fig. 3.

In Figs. 1 and 2 of the accompanying drawings, the numeral 2 designates the housing or frame of a pipe threading machine, having a base 3 by which it is mounted on a suitable foundation. The housing is provided on one side with a horizontally projecting shelf 4 having shears or ways 5 thereon for the horizontally sliding carriage 6 on which the pipe threading dies are adjustably mounted. In the form of apparatus shown in these figures, the thread cutting dies are removably secured on the sliding carriage 6, which is arranged to be adjusted on the ways 5, toward and away from the chuck, a hand wheel 7 being employed to actuate a pinion on a shaft which in turn meshes with a rack on the carriage 6 in adjusting the carriage, to bring the end of the pipes held in position by the chuck into engagement with the thread cutting dies. The rack and pinion construction not forming part of this invention is not shown or further described.

Rotatably mounted in bearings 8, 8, on the housing 2 of the threading machine, is a hollow spindle forming the barrel 9, this barrel having an axial opening 10, through which the pipes 11 extend while being threaded, the pipe end to be threaded projecting beyond the end of the shaft 9 so as to permit engagement thereof by the threading dies on the carriage 6. Bolted or otherwise secured to the integral flange 12 on the barrel 9 is a spur gear 13 by which the barrel is positively rotated. The teeth of the gear 13 are in mesh with the teeth of the spur pinion 14, which is rotatably mounted on the pin or shaft 15, this shaft being secured at one end in the opening in the boss 16 and the other end being supported in the opening in the boss 17 which form part of the threading machine housing 2. The pinion 14 is provided with a hub portion 18 on which a spur gear 19 is keyed or otherwise fastened to turn therewith and the teeth of the gear 19 are in mesh with the teeth of the spur pinion 20 on the armature shaft 21 of the driving motor 22. The motor 22, as shown, is conveniently mounted on the support 23 formed for that purpose on the top of the housing or frame 2 of the pipe threading machine. Obviously however, the motor 22 may be otherwise located and connected by suitable slow down gears to the barrel 9 within the spirit of my invention. The barrel 9 also has flanges 24, 25, on its ends and bolted or otherwise secured to the flange 24, on the rear end of the barrel, so as to rotate therewith, is the head or carrier 26 for the differential gearing by which the gripping jaws 27 of the gripping mechanism are moved into and out of pipe gripping position.

The carrier 26 as shown, is provided with a series of three radially extending recesses 28 and in each of these recesses is a grip block 29 having a gripping jaw 27 removably secured thereto. The grip blocks 29 have a transverse opening therein, in which an internally threaded nut 30 is secured and extending through each of the nuts 30 is a screw threaded spindle 31. The unthreaded outer ends of the spindles 31 project through openings in the annular flange 33 forming part of the carrier 26 which rotates with the carrier and a bevel pinion 34 is keyed or otherwise secured to the projecting end of each of the spindles 31, the rear end of the spindles projecting into the bearings 35 therefor, formed by the bushed radial openings in the ring 36 of the carrier, the ring 36 as shown, being an integral part of and rotating with the carrier 26. Secured on the sides of the carrier 26 are the ring gears 37 and 38, these gears having bevel teeth 39, 40, which mesh with the teeth of the bevel pinions 34 on the outer ends of the spindles 31 so as to rotate these spindles. Each of the two ring gears, 37 and 38, is provided with a cylindrical portion forming a friction or gripping surface 41 or 42 for the friction bands 43 and 44. The friction bands encircle the ring gears 37 and 38 and one end of the band 43 is fastened to the horizontally extending arm of the bell crank 44ª and the other end thereof is adjustably secured by a sleeve nut 45 to the swinging end of the vertically extending arm of the bell crank 44ª, this bell crank being employed to move the band 43 into and out of gripping position on the band surface 41. The horizontal arm of the bell crank also is connected, at its outer end, by a link 46 to the foot lever 47 by which the friction band 43 is actuated, this lever being pivoted at one end to the pivot stand 48 for the bell crank and extending beneath the head or carrier 26, a pedal 49 being provided on its outer end for the foot of the operator. The friction band 44 on the friction surface 42 of the other ring gear 38 is connected at one end to the horizontally extending arm of a bell crank in the same manner as has been described and the vertically extending arm of this bell crank is connected by a link to the operating lever 50, which extends beneath the carrier 26 and has a pedal 51 on its outer end, by which it is pressed by the foot of the operator.

Referring now to the modified construction shown in Figs. 3 and 4, in which similar parts are designated with the same numerals as in Figs. 1 and 2. This apparatus, being actuated by power means, is particularly adapted for use on the larger sizes of threading machines, although also capable of use with machines of any size. The barrel 9 is mounted in bearings on the housing 2 and is driven in the manner shown in Figs. 1 and 2 by a motor 22. The head or carrier 26 for the differential gearing employed in actuating the gripping jaws 27 is secured on the flange 24 on one end of the barrel 9, and, like that shown in Figs. 1 and 2, is provided with a series of three radially extending recesses in each of which a grip block 29 having a gripping jaw 27 detachably secured thereon is mounted. The grip blocks 29 are connected to the spindles 31 in the same manner as in Figs. 1 and 2 but in this construction the bevel gears 34 are formed integrally on the end of the spindles 31. The outer ends of the spindles 31 project into bushed openings 35 in the ring 36 forming part of the carrier 26 and secured at the sides of the carrier so as to turn with and relatively to the carrier are ring gears 37, 38, having bevel teeth 39, 40, which mesh with the teeth of the bevel pinions 34. The ring gears 37 and 38 have cylindrical portions forming friction or gripping surfaces 41 or 42, for the friction bands 43, 44. The friction bands encircle the ring gears 37 and 38 and are connected to the ends of the arms of bell cranks 44ª in the same manner as in Figs. 1 and 2 but in the apparatus of Figs. 3 and 4 the bell cranks 44ª are keyed or otherwise fastened to shafts 53 carried in the brackets 54 which are formed on the casing 55. These shafts have lever arms 56, 57, thereon, the outer swinging ends of which are arranged to engage with opposite ends of the piston rod 59 in the fluid pressure cylinder 60 which is mounted on top of the casing 55 surrounding the carrier 26 and fastened to the side of the housing 2. The piston rod 59 has a piston 61 at an intermediate point in its length so that the cylinder 60 in which it is mounted is double acting. Ports in the opposite ends of the cylinder are connected by pipes 62, 63, through a suitable operating valve, (not shown), with a source of fluid pressure, and the heads 64 of the cylinder through which the opposite ends of the piston rod project are provided with the usual stuffing boxes 65 and glands 67.

By reference to Fig. 3 it will be seen that the part of the piston rod 59 on the left hand of the piston 61 is of smaller diameter than that on the right hand side of the piston, this construction being employed to enable the ring gears by which the jaws are actuated in releasing the pipe, to be more tightly gripped by the friction band than the other gear used for tightening the gripping jaws, as is necessary in practice.

An antifriction roller 68 is mounted by means of an adjustable bracket 69 on the side of the casing 55 to support the pipes when being placed in between the gripping jaws 27, in position to be engaged thereby.

In the operation of my improved apparatus, gripping jaws 27 of the required size are placed in operative position in the gripping blocks 29 and these blocks and jaws are adjusted radially in the slots 28 into operative position so as to grip the size of pipes to be threaded. It will be readily understood that by varying the thickness of the jaws or distance between the dovetailed side and the serrated pipe gripping side thereof, that pipes of a variety of sizes are at of course different times, readily fastened in the chuck. The pipe 11 is then inserted in place within the barrel 9 with the end thereof to be threaded projecting beyond the end of the barrel, in the position shown in Fig. 1. The motor 22 is then started to operate which, through the gears 13, 14, 19 and 20 positively rotates the barrel 9 and the chuck head or carrier 26 on the rear end of this barrel. When the pedal levers 47 and 50, are in the position shown, their own weight acts to move the bell cranks connected to the respective levers to extend the friction bands 43, and 44 and holds them loosely in contact on the friction gripping surfaces 41, 42, of the annular ring gears 37, 38. After the pipe 11 is inserted in place as shown, the operator will tread on the pedal 49 on the outer end of the lever 47. This causes the friction band 43 connected to this lever to tightly engage the friction surface 41 of the ring gear 37 and hold this ring gear so as to prevent its rotating with the head or carrier 26. Meantime the head or carrier continues to rotate. The now stationary ring gear 37 will cause the bevel pinions which move with the carrier to rotate and, through the spindles 31 on the carrier, to which the pinions are keyed or otherwise secured, move the gripping blocks 29 and gripping jaws 27 radially inward until in gripping position on the pipe 11. The operator then removes his foot from the pedal 49 of the lever 47 and thereby releases the friction band 43. The ring gear 37 then turns with the carrier 26 and spindle 9 and through the gripping jaws 27 rotates the now gripped pipe 11. The threading die carriage 6 is then advanced on the slides or ways 5, by turning the wheel 7 so as to bring the threading dies into engagement with the end of the rotating pipe and cut the threads on the pipe in the usual known manner. When a thread of sufficient length has been cut on the end of the pipe, the threading dies are retracted so as to clear the threads and the carriage 6 is then moved backwardly until again in the position shown in Fig. 1. The operator then presses the pedal 51 on the other foot lever 50 and thereby tightens the friction band 44 connected to this lever and extending around the friction or gripping surface 42 of the ring gear 38 on the opposite side of the chuck head or carrier. Tightening of the friction band 44 on the ring gear 38 holds this ring against rotation and when so held the bevel gear teeth 40 on the ring gear 38 which mesh with the teeth of the bevel pinions 34 cause these pinions to rotate in a counter clockwise direction and turn the adjusting spindles 31 in the carrier. When turned in this direction the spindles 31 back off or retract the gripping blocks 29 and gripping jaws 27 attached thereto so as to release the pipe 11 which has been held therebetween. The pipe 11 is then moved endwise until clear of the chuck on the end of the threading machine. Another unthreaded pipe is then moved into the position shown in Fig. 1, to replace the one just removed and when this is done the operations which have just been described are again repeated. The above described operations are then carried out with successive pipes in cutting the thread on one end of the pipe.

When but one threading machine is employed to thread both ends of the pipe, the pipes will be turned end for end in providing the thread on the last threaded end of the pipes. A more convenient arrangement will be to employ two threading machines located at a distance apart slightly greater than the length of the longest pipes made.

In the operation of the apparatus of Figs. 3 and 4 the pipes are gripped by the jaws 27. These jaws are actuated through the bevel pinions 34 and ring gears 37, 38, and the ring gears are held against rotation by the friction bands 43, 44, in the same manner as in the apparatus of Figs. 1 and 2. The friction bands in this construction are actuated by means of the fluid pressure cylinder 60 and piston 61 so that instead of tightening the bands by treading on the end of a lever, the operator moves the valve connected to the pipes 62 and 63 into the required position to admit fluid pressure to the cylinder on the desired side of the piston 61, which moves the required friction band and, by the same movement, actuates one of the bell cranks 44ª to release the other band.

During the pipe threading operations the fluid pressure is shut off from the cylinder 60 and the piston 61 moves into a substantially central position so that both of the friction bands 43 and 44 are loose and the ring gears 37 and 38 rotate with the carrier 26.

The advantages of my invention will be appreciated by those skilled in the art. Instead of tightening the gripping jaws on the pipe by manual labor to cause gripping engagement with the pipe, the chuck is actuated by power means, the operator merely placing and holding his foot on the proper pedal or moving a valve into the proper position to cause the gripping jaws to be moved into or out of holding engagement with the pipe. The apparatus is simple and is easily kept in repair.

Modifications in the construction and arrangement of the parts may be made without departing from my invention. The manner of driving the rotating mechanism may be changed, the chuck may be applied to other uses than to a pipe threading machine.

Instead of employing two friction bands and two ring gears, as shown, but one friction band and one ring gear may be used and in such case the driving motor will be reversed to move the gripping jaws, and other variations may be made within the scope of my invention as defined in the appended claims.

I claim:—

1. A chuck comprising a rotary barrel having a jaw carrier thereon, a plurality of radially movable relatively adjustable gripping jaws on the carrier, means for rotating the barrel and jaw carrier and means for adjusting the gripping jaws, said means comprising ring gears rotatable relatively to the carrier, said ring gears having friction surfaces thereon, spindles connected to said gripping jaws and having a bevel pinion thereon, said pinions meshing with the ring gears, friction bands encircling said friction surfaces, a bell crank having arms connected to the ends of said friction bands, and a fluid pressure cylinder having a piston operatively engaging with the bell cranks to tighten the bands on the friction surfaces and thereby hold the ring gears against rotation with the carrier.

2. A chuck comprising a rotary barrel having a jaw carrier thereon, a plurality of radially movable relatively adjustable gripping jaws on the carrier, means for rotating the barrel and jaw carrier and means for adjusting the gripping jaws, said means comprising ring gears rotatable relatively to the carrier, said ring gears having friction surfaces thereon, spindles connected to said gripping jaws and having a bevel pinion thereon, said pinions meshing with the ring gears, friction bands encircling said friction surfaces, a bell crank having arms connected to the ends of said friction bands, and a fluid pressure cylinder having a piston operatively engaging with the bell cranks to tighten one band and release the other band on the friction surfaces in holding the ring gears against rotation with the carrier.

In testimony whereof, I have hereunto set my hand.

DAVID HEGGIE.

Witnesses:
  JAS. H. FLENNIKEN,
  DAVID H. PINKNEY.